United States Patent [19]

Miller

[11] 3,879,160

[45] Apr. 22, 1975

[54] ISOSTATIC CURING APPARATUS

[75] Inventor: Donald Miller, Rockaway, N.J.

[73] Assignee: The United States of America as represented by the Secretary of the Army, Washington, D.C.

[22] Filed: Aug. 6, 1974

[21] Appl. No.: 495,178

[52] U.S. Cl. ..... 425/405 H; 425/393; 425/DIG. 19; 249/65
[51] Int. Cl. ............................................ B30b 5/02
[58] Field of Search .............. 425/292, 293, 405 H, 425/DIG. 19; 249/65

[56] References Cited
UNITED STATES PATENTS

| | | | |
|---|---|---|---|
| 2,644,198 | 7/1953 | Crawford | 425/DIG. 19 |
| 2,999,780 | 9/1961 | Perrault | 425/405 H X |
| 3,015,855 | 1/1962 | Merkel | 425/DIG. 19 |
| 3,184,528 | 5/1965 | Norwalk | 425/405 H X |
| 3,257,690 | 6/1966 | Scott | 249/65 X |
| 3,290,728 | 12/1966 | Pratt | 425/393 X |
| 3,377,657 | 4/1968 | Richardson et al. | 249/65 X |
| 3,561,079 | 2/1971 | Anderson | 425/405 H X |
| 3,674,394 | 7/1972 | Wiltshire | 425/DIG. 19 |

Primary Examiner—J. Howard Flint, Jr.
Attorney, Agent, or Firm—Nathan Edelberg; Robert P. Gibson; Max Yarmovsky

[57] ABSTRACT

An isostatic curing apparatus provides for the curing of a wrapped reinforced composite fibrous laminate into a hollow structural form with minimum subsequent effect on fiber positioning. A pressurized container is used to support a flexibly sleeved blow-through mandrel upon which is wrapped a fiber reinforced composite tape under relatively low tension. The apparatus permits fluid pressure to be internally and externally applied to the composite laminate during the curing process.

7 Claims, 5 Drawing Figures

3,879,160

ISOSTATIC CURING APPARATUS

GOVERNMENTAL INTEREST

The invention described herein may be manufactured, used and licensed by or for the governmental purposes without the payment to me of any royalty thereon.

BACKGROUND OF THE INVENTION

Various means have been used in the prior art to fabricate a class of fiber reinforced composites known as undirectional tapes. The use of these materials in certain items such as gun-tubes, launcher tubes, helicopter landing-gear, rotors, etc., allows for optimum strength-to-weight performance of the composite. Prior art devices wrapped the fibrous tape onto a surface of revolution generally under low tension and then cured the assembly under high pressure (50–100 psi). This procedure, in most instances, caused the fibers of the tape to buckle and shift. This problem has existed in the prior art since the inception of pressure bag molding. Prior art devices have tried to alleviate the fiber buckling, which causes localized structural weakness, by applying higher amounts of tension to the fibers during the wrapping procedure. The use of high tension during the wrapping procedure was usually unsatisfactory because it produced high fiber breakage and induced residual fiber stresses which again resulted in a weakened composite. Others in the prior art have tried to overcome the aforementioned problem by applying internal pressure to the curing composite by use of a female mold. While the aforementioned prior art devices utilizing female molds permitted fiber tension to be produced during cure, they are generally unsatisfactory because they are time consuming and costly to make and use.

SUMMARY OF THE INVENTION

The present invention relates to a device for curing composite laminates in the form of surfaces of revolution. The laminates are wrapped at low tension on a blow-through mandrel, and simultaneously pressurized internally and externally while being cured. The present invention permits surfaces of revolution to be made from composite materials such as graphite-epoxy, graphite-polyimide, fiber glass-epoxy and other similar composites.

One of the objects of the present invention is to provide an apparatus for isostatically curing a reinforced composite laminate which is wrapped under low tension in the form of a surface of revolution.

Another object of the present invention is to provide an apparatus for isostatically curing a reinforced composite laminate which does not cause buckling of an laminate's fibers.

Another object of the present invention is to provide an apparatus for isostatically curing a reinforced composite laminate which does not require excessive pretensioning of the laminate's fibers.

Another object of the present invention is to provide an apparatus for curing a reinforced composite laminate which does not require the use of a female mold.

Another object of the present invention is to provide an apparatus for curing a reinforced composite laminate which is relatively void-free.

A further object of the present invention is to provide an apparatus for curing a reinforced composite laminate which is structurally stronger than composites made by filament-winding or the lay-up of woven fabrics.

For a better understanding of the present invention, together with other and further objects thereof, reference is made to the following descriptions taken in connection with the accompanying drawings.

BRIEF DESCRIPTION OF THE DRAWINGS

Throughout the following description like reference numerals are used to denote like parts of the drawings.

DESCRIPTION OF THE PREFERRED EMBODIMENTS

Figure 3:
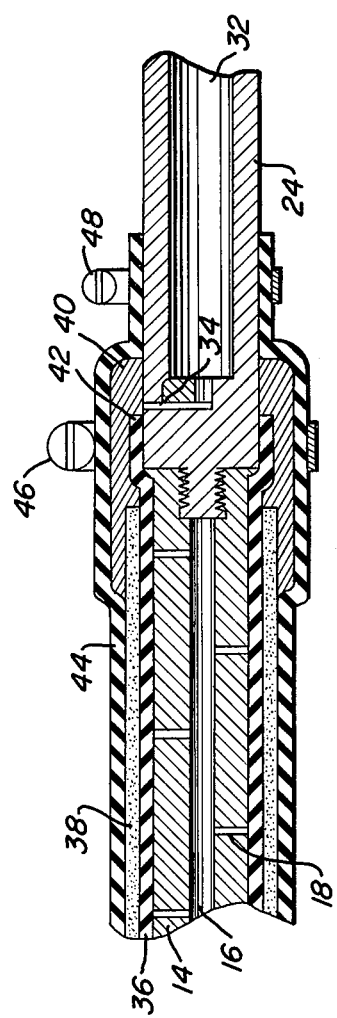
FIG. 3 is an enlarged partial cross-sectional view of the clamped right hand end of an assembled mandrel shown in FIG. 1.

Referring now to FIGS. 1–5, the isostatic curing apparatus comprises an outer pressure vessel assembly 10 and an inner internal pressure mandrel assembly 12. The mandrel assembly 12 comprises a tubular member 14 having an axial longitudinal bore 16 and a plurality of radial bores 18 communicating with the axial bore 16. The tubular member 14 has internally threaded right and left hand ends 20 and 22 respectively. Screwed to the right hand end 20 is an axial aligned venting end member 24. Screwed to the mandrel left hand end 22 is an axial aligned fluid inlet end member 26. The fluid inlet end member 26 has a threaded axial fluid inlet bore 28 which communicates with a smaller axial bore 30 which in turn communicates with the longitudinal bore 16. A fluid supply means (not shown) is connected to the threaded inlet bore 28. The right hand venting end member 24 has an axial counterbore 32 which communicates with a plurality of radially positioned venting bores 34. An inner silicone rubber sleeve 36 is positioned over tubular member 14 and over a portion of the venting and fluid inlet end members 24 and 26 respectively. The reinforced composite fibrous laminate 38 is wrapped around only that portion of the inner sleeve 36 which covers the tubular member 14. A burlap bleeder cloth 40 is wrapped around a portion of the laminate 38, the inner sleeve end 42 and a portion of the venting end member 24 so that it covers the radially positioned venting bores 34. The inner rubber sleeve 36 does not cover the venting bores 34 and thereby does not prevent the residual air from the laminate from escaping to the venting member 24 through the burlap cloth 40 and venting bores 34. An outer silicone rubber sleeve 44 is applied over the composite laminate 38, the burlap bleeder cloth 40, over the inner sleeve 36 on the fluid inlet end member 26, and over a portion of the venting end member 24. A first screw-band type clamp 46 is positioned over the portion of the venting end member 24 which is underneath the combination of the inner sleeve end 42, the burlap 40 and the outer sleeve 44. A second screw-band clamp 48 positioned to right of clamp 46 provides the necessary contact force to form a fluid-tight seal between the end member 24 and the outer sleeve 44.

A third screw-band clamp 50 provides a fluid-tight seal between the inner and outer sleeves 36 and 44 respectively and the inlet end member 26. The mandrel assembly 12 is axially supported within the flanged hollow cylindrical housing 52 by a first housing end plate 54 and a second housing end plate 56. First end plate member 54 has an axial bore 58, and second end plate 56 has an axial bore 62. A first disc shaped gasket 66 is positioned intermediate a first holding nut 68 and first end plate 54. Holding nut 68 is screwed to an externally threaded end 70 of the fluid inlet end member 26. In similar fashion a second disc shaped gasket 72 is positioned intermediate second holding nut 74 and second end plate 56. Holding nut 74 is screwed to an externally threaded end 76 of the venting end member 24. The holding nuts 68 and 74 help center the mandrel assembly 12 in the outer pressure vessel assembly 10 and to squeeze gaskets 66 and 72 which effect a pressure seal between first end plate 54 and holding nut 68 and second end plate 56 with holding nut 74 respectively. A plurality of holding screws 78 peripherally positioned around and through the first and second end plates 54 and 56 are screwed into housing end flanges 80 and 82 respectively. Positioned intermediate the flanges 80, 82 and end plates 54 and 56 respectively are annularly shaped gaskets 84 and 86 respectively.

Figure 1:
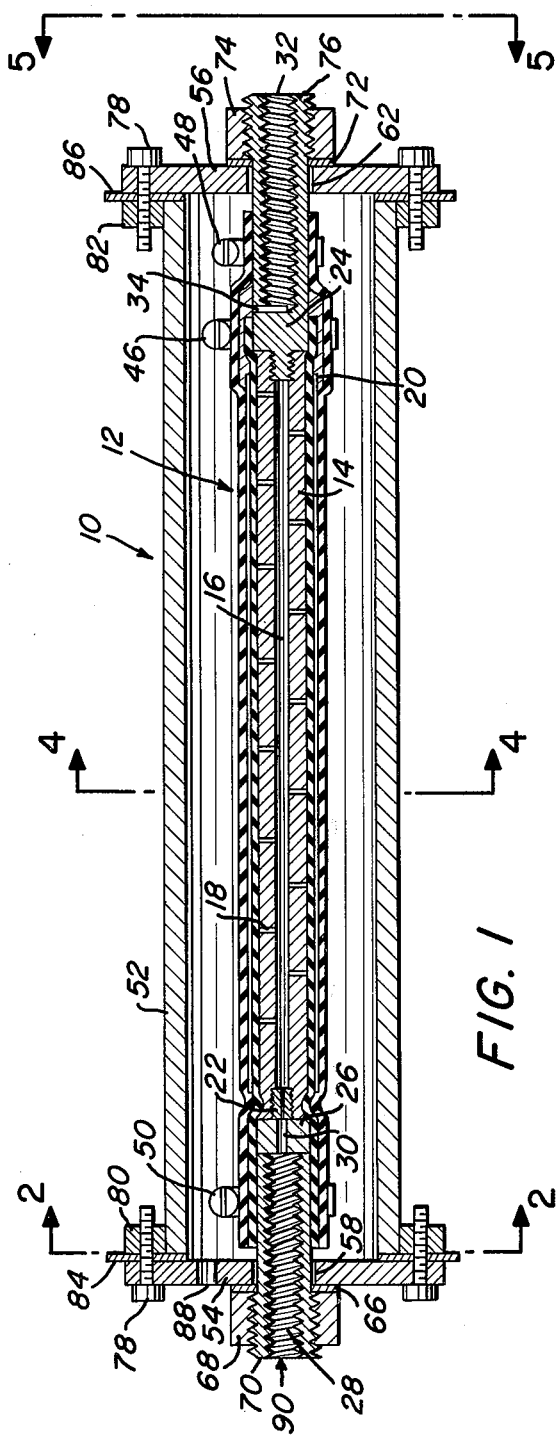
FIG. 1 is a longitudinal cross-sectional view of the isostatic curing apparatus.
Figure 2:
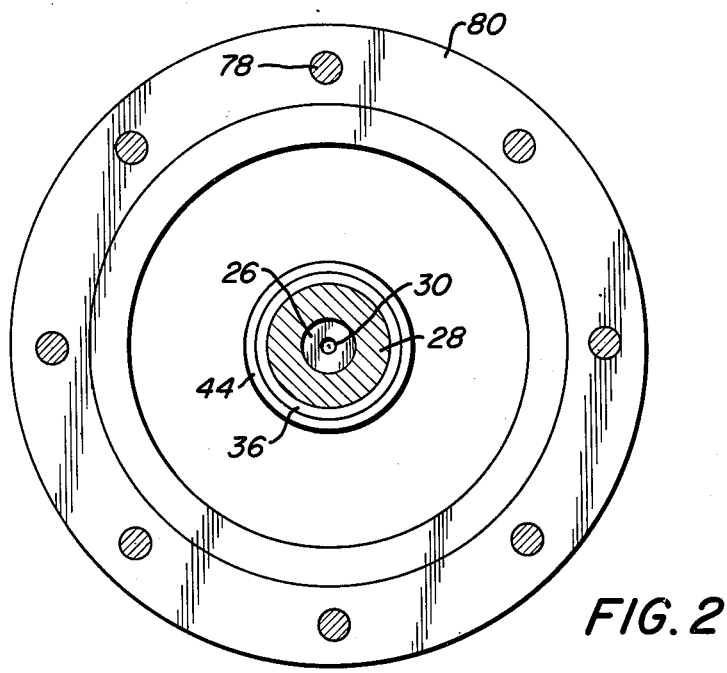
FIG. 2 is an end view of the apparatus looking along line 2–2 of FIG. 1.
Figure 4:
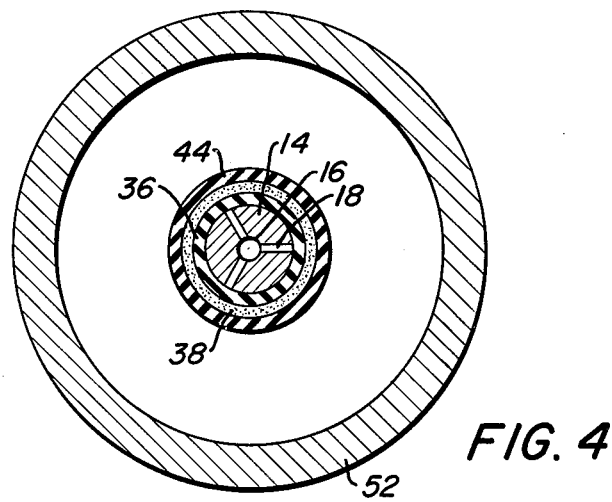
FIG. 4 is a cross-sectional view of the apparatus taken along line 4–4 of FIG. 1.
Figure 5:
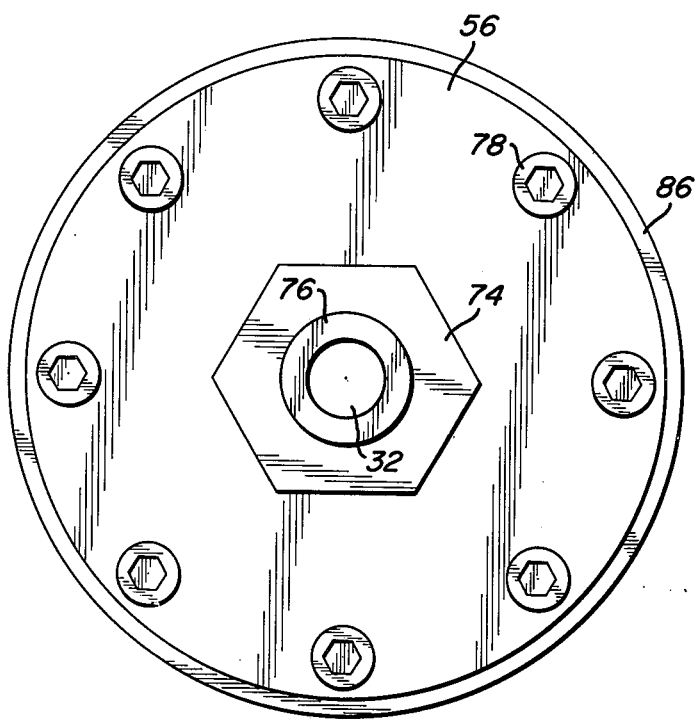
FIG. 5 is an end view of the appartatus taken along line 5–5 of FIG. 1.

In operation, after the structural elements are assembled as shown in FIG. 1, fluid pressure is applied to the outer sleeve 44 through first inlet orifice 88. At the same time that fluid pressure is applied through first inlet orifice 88, fluid pressure is applied through second inlet orifice 90. In this manner external pressure is applied to the curing composite 38 via outer rubber sleeve 44 while simultaneously internal pressure is applied to composite 38 via inner rubber sleeve 36. The external-internal pressure ratio, temperature and time may be varied to provide proper cure for a specific composite laminate. The porous burlap bleeder cloth 40 permits the isostatic process to function because it allows a great enough load to be transmitted through it to provide a proper force to the inner sleeve end 42 while still providing a path for the entrapped gases between the composite layers and between the composite and sleeves to exhaust through venting bores 34 and venting counterbore 32.

The foregoing disclosure and drawings are merely illustrative of the principles of this invention and are not to be interpreted in a limiting sense. I wish it to be understood that I do not desire to be limited to the exact details of construction shown and described for obvious modifications will occur to a person skilled in the art.

Having thus fully described the invention, what is claimed as new and desired to be secured by Letters Patent of the United States is:

1. An isostatic curing apparatus which comprises:
   hollow mandrel means for supporting a reinforced composite laminate wrapped thereon;
   housing means for holding said mandrel means therein, and for subjecting said mandrel means to fluid pressure;
   flexible sleeve means for simultaneously transmitting internal and external pressure to said laminate;
   fluid means for exerting pressure on said sleeve means; and
   clamping means for holding said sleeve means to said mandrel means while permitting entrapped gases in said composite laminate to be vented through said mandrel means.

2. An apparatus as recited in claim 1 wherein said mandrel means comprises:
   a tubular member having an axial longitudinal bore and a plurality of radial bores communicating with said longitudinal bore, said tubular member having internally threaded ends;
   a fluid inlet end member screwed to one threaded end of said tubular member, said fluid inlet end member having an axial fluid inlet bore therein which communicates with said longitudinal bore; and
   a venting end member screwed to the other threaded end of said tubular member, said venting end member having an axial counterbore therein and a plurality of radially positioned venting bores which communicate with said axial counterbore.

3. An apparatus as recited in claim 1 wherein said housing means comprises:
   a flanged tubular housing;
   a first housing end plate connected to one end of said tubular housing, said first end plate having an axial bore therein which allows said first end plate to slidably fit over said fluid inlet end member, and a first inlet orifice positioned therein;
   a second housing end plate connected to the other end of said tubular housing, said second end plate having an axial bore therein which allows said second end plate to slidably fit over said venting end member;
   a first nut threadedly attached to said fluid inlet end member;
   a second nut threadedly attached to said venting end member, said first and second nuts preventing said mandrel means from slidably moving within said housing means; and
   gasket means positioned intermediate said first and second housing end plates and the ends of said flanged tubular housing for retaining said fluid means within said housing means.

4. An apparatus as recited in claim 2 wherein said flexible sleeve means comprises:
   an inner rubber sleeve positioned over said tubular member and under said laminate, and partially over said venting end member and said fluid inlet end member; and
   an outer rubber sleeve positioned over said laminate and partially over said venting end member and said fluid inlet member.

5. An apparatus as recited in claim 4 wherein said clamping means comprises:
   a bleeder cloth positioned between said inner and outer sleeves partially covering said venting end member;
   a first screw-band clamp forcibly holding said outer sleeve, bleeder cloth and inner sleeve tightly positioned to said venting end member to effect a fluid-tight seal between said inner sleeve and said venting member while allowing air to pass from said laminate through said bleeder cloth to said venting bores;
   a second screw-band clamp holding said outer sleeve to said venting end member to effect a fluid-tight seal therebetween; and a third screw-band clamp forcibly holding said outer and inner sleeves to said fluid inlet end member to effect a fluid-tight seal therebetween.

6. An apparatus as recited in claim 4 wherein said rubber sleeve is made of silicone rubber.

7. An apparatus as recited in claim 5 wherein said bleeder cloth is made of burlap material.

* * * * *